(12) United States Patent
Klennert (10) Patent No.: US 9,689,740 B2
(45) Date of Patent: Jun. 27, 2017

(54) DIAGNOSTIC FOR SPECTRALLY COMBINED LASER

(71) Applicant: The Boeing Company, Chicago, IL (US)

(72) Inventor: Wade L. Klennert, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 14/515,005

(22) Filed: Oct. 15, 2014

(65) Prior Publication Data

US 2016/0109290 A1    Apr. 21, 2016

(51) Int. Cl.
| | |
|---|---|
| *G01N 21/25* | (2006.01) |
| *G01J 1/42* | (2006.01) |
| *G02B 3/00* | (2006.01) |
| *G02B 27/10* | (2006.01) |
| *G01J 9/00* | (2006.01) |
| *G01J 1/04* | (2006.01) |

(52) U.S. Cl.
CPC ........... *G01J 1/4257* (2013.01); *G01J 1/0488* (2013.01); *G01J 9/00* (2013.01); *G02B 3/0006* (2013.01); *G02B 27/1006* (2013.01)

(58) Field of Classification Search
CPC .......... G01J 1/4257; G01J 1/0488; G01J 9/00; G02B 3/0006; G02B 27/1006
USPC ......................................................... 356/416
See application file for complete search history.

(56) References Cited

U.S. PATENT DOCUMENTS

| | | | | |
|---|---|---|---|---|
| 4,816,668 A | * | 3/1989 | Williams | B07C 5/3412 |
| | | | | 235/462.03 |
| 5,101,393 A | * | 3/1992 | Marshall | G11B 7/09 |
| | | | | 369/44.14 |
| 5,434,632 A | * | 7/1995 | Carmichael | G03B 21/53 |
| | | | | 348/745 |

(Continued)

OTHER PUBLICATIONS

"Shack-Hartmann wavefront sensor precision and accuracy"; Daniel R. Neal, James Copland, David Neal; WaveFront Sciences, Inc.; Proceedings of SPIE vol. 4779 (20002) pp. 148-160.

(Continued)

*Primary Examiner* — Hina F Ayub
(74) *Attorney, Agent, or Firm* — Miller, Matthias & Hull LLP (57) ABSTRACT

A diagnostic unit is used to align and focus individual laser sources in a spectral beam combining (SBC) laser. The diagnostic unit modifies a Shack-Hartmann wavefront sensor to dedicate one or more microlenses to a particular wavelength of the SBC laser using wavelength-specific filters in combination with corresponding microlenses. The diagnostic unit allows all of the laser sources to be evaluated at the same time because each wavelength has a dedicated portion of the sensor, typically a charge-coupled display. When an individual beam is centered in its dedicated portion of the sensor and has an acceptable spot size or intensity, the source for that particular beam is correctly aligned and focused. Off-center or incorrect spot-sized beams indicate incorrect alignment and focus for the laser source for that wavelength. When correctly calibrated, the sensor output can also be used to measure and correct power output levels of the individual laser sources.

20 Claims, 9 Drawing Sheets

(56) References Cited

U.S. PATENT DOCUMENTS

| | | | | |
|---|---|---|---|---|
| 8,665,440 B1* | 3/2014 | Kompaniets | ........... | G01N 21/31 |
| | | | | 356/402 |
| 2002/0185585 A1* | 12/2002 | Jutte | .................... | G11B 7/1353 |
| | | | | 250/201.5 |
| 2003/0107814 A1* | 6/2003 | Altmann | .............. | A61B 3/1015 |
| | | | | 359/619 |
| 2003/0112410 A1* | 6/2003 | Altmann | ............ | G01M 11/0257 |
| | | | | 351/212 |
| 2010/0012818 A1* | 1/2010 | Baker | ....................... | G01J 9/00 |
| | | | | 250/201.9 |
| 2012/0093182 A1* | 4/2012 | Eichhorn | ................ | H01S 3/139 |
| | | | | 372/29.023 |
| 2012/0241989 A1* | 9/2012 | Sugimoto | .......... | G01M 11/0228 |
| | | | | 264/1.1 |
| 2012/0307256 A1* | 12/2012 | Jennings | ................. | G01S 3/783 |
| | | | | 356/477 |
| 2014/0268146 A1* | 9/2014 | Hinnrichs | ................. | G01J 3/18 |
| | | | | 356/364 |
| 2015/0062410 A1* | 3/2015 | Kim | .................... | H04N 5/2353 |
| | | | | 348/362 |
| 2016/0062059 A1* | 3/2016 | Stacey | ................... | G02B 6/423 |
| | | | | 385/52 |

OTHER PUBLICATIONS

"Determination of wavefront structure for a Hartmann Wavefront Sensor using a phase-retrieval method"; A. Polo, V. Kutchoukov, F. Bociort, S.F. Pereira, and H.P. Urbach; Optics Research Group, Delft University of Technology, Lorentzweg 1, 2628 CJ Delft, The Netherlands; Mar. 26, 2012; vol. 20, No. 7; Optics Express 7822-7832.

\* cited by examiner

DIAGNOSTIC FOR SPECTRALLY COMBINED LASER

FIELD

This disclosure relates to spectrally combined lasers and particularly to a device for performing diagnostics on a spectrally combined laser.

BACKGROUND

Spectral beam combining (SBC) lasers are becoming common in both low power and high power applications. By joining individual laser beams of different wavelengths, the overall power output of a laser can be increased without the difficulties of coherent beam combining of laser sources at the same wavelength. However, it can be difficult to ensure that each laser source is correctly aligned and focused once the various beams are combined.

One method of aligning and focusing requires that each beam be turned on separately and its output observed for alignment and focus. However, even this time consuming approach does not guarantee that an adjustment to one laser source has not caused a mechanical or other change to a previously adjusted laser source.

SUMMARY

In an aspect of the disclosure, a diagnostic unit for use in evaluating alignment, focus, and/or power for each of a plurality of laser sources in a spectral beam combining (SBC) laser may include a spectral filter array arranged to accept laser output of the SBC laser that includes one or more spectral filters for at least one wavelength present in the SBC laser. The diagnostic unit may also include a microlens array including at least one microlens for the particular wavelength present in the SBC laser and a sensor aligned with the microlens array and the spectral filter so that the laser energy passing through the at least one spectral filter and the at least one microlens activates a portion of the sensor. An output of the sensor associated with the activated portion corresponds to the alignment and the focus of the corresponding wavelength of the SBC laser.

In another aspect of the disclosure, a diagnostic unit may be used for evaluating a set-up for each of a plurality of laser sources in a spectrally combined laser (SBC laser). Each of the plurality of laser sources may have a separate wavelength. In a hybrid approach, a laser source may be a system of individual lasers on a single wavelength that are coherently combined before the single wavelength output is spectrally combined with the outputs of other laser sources. The diagnostic unit may include a spectral filter adapted to pass one selected wavelength of laser energy from the SBC laser. The diagnostic unit may also include a microlens aligned with the spectral filter. The laser energy passing through both the spectral filter and the microlens causes activation of an area of the sensor, the activated area indicating an alignment of a source of the laser energy on the selected wavelength.

In yet another embodiment, a method of performing diagnostics on a spectral beam combining (SBC) laser having a plurality of sources of laser energy at different wavelengths includes receiving SBC laser energy and filtering the SBC laser energy to pass a single wavelength of the SBC laser energy. The method may include either before or after filtering the SBC laser energy, focusing the SBC laser energy toward a sensor. The method may also include illuminating, with the filtered and focused SBC laser energy, a portion of the sensor, and analyzing the illuminated portion of the sensor to provide alignment information and focus information for a source of the single wavelength of the SBC laser energy.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1A:
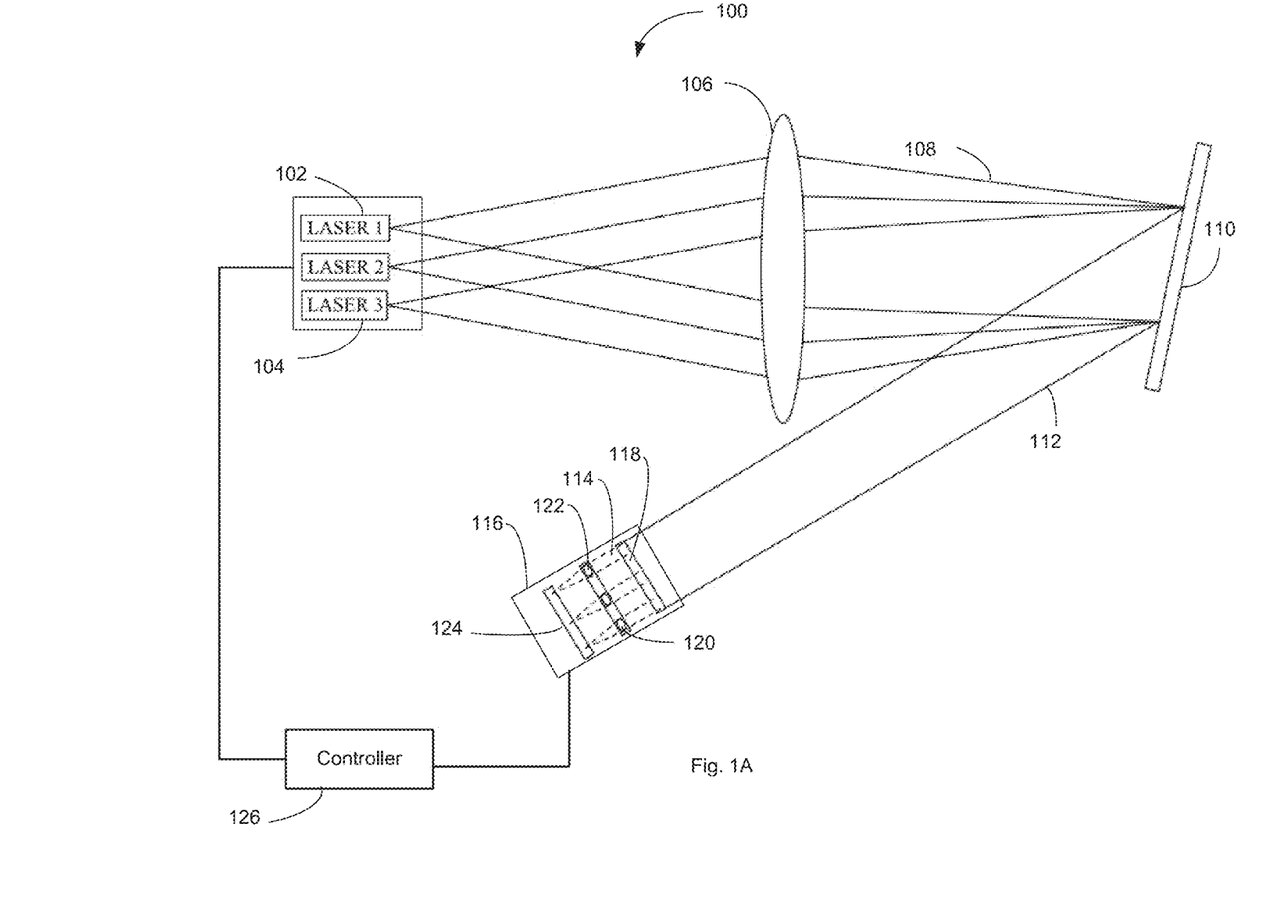
FIG. 1A is a top view of a spectrally combined laser incorporating a diagnostic unit.

FIG. 1 illustrates in a simplified form a spectral beam combining (SBC) laser 100. The SBC laser 100 includes a plurality of laser sources 102, 104, etc., that each emit laser energy at different wavelengths. In some embodiments, a laser source 102 may be a single laser outputting one wavelength. In other embodiments, the laser source 102 may be a number of single-wavelength lasers that are first coherently combined before spectral combining. The laser energy may be in the visible spectrum (light energy) or may be outside the visible spectrum, including ultraviolet or infrared. Each laser source 102, 104 emits laser energy that is directed by lens 106 to a grating 110, such as a diffraction grating or Volume Bragg Grating™. The lens 106 serves to direct each beam across a designated area of the diffraction grating 110. The nature of the grating 110 reflects or transmits each wavelength at a different angle so that an output of the grating is a single beam 112 having each wavelength distributed throughout the beam 112. All of the wavelengths in the beam 112 are generally parallel. In some embodiments, an additional lens (not depicted) may be used to further focus the beam 112.

However, as discussed above, mis-alignment, poor focus, or other degradation over time in the individual laser sources 102, 104 can cause the beam 112 to have individual laser beam components which are low power, not parallel, or are not properly focused. The result is that these particular wavelengths contribute less than their full potential to the output of the SBC laser. A diagnostic unit 116 may be used to identify alignment and focus characteristics of all of the individual component wavelengths of the SBC laser beam 112 with a single measurement or high speed real time measurements.

A Shack Hartmann sensor is known in optics for detecting variations in a wavefront, particularly wavefront variations resulting from imperfections in optical lenses. A common use for the Shack Hartmann sensor is to observe light reflected off the back of a human eye for characterizing an eye lens in preparation for Lasix surgery to correct the lens. A basic Shack Hartmann sensor uses a number of microlenses in a two-dimensional array to focus individual light beams on a sensor so that wavefront variations of the incoming light are shown as displaced dots on the sensor, one dot for each micro lens. That is, a light beam with a perfectly flat wavefront will create a perfectly aligned grid pattern on the sensor. A light beam with a curved wavefront, for example as a result of an imperfect eye lens, will create off grid dots for those areas where the wavefront is not flat.

As shown in FIG. 1A, the diagnostic unit 116 is receives laser energy from the beam 112. In front of the traditional elements of the Shack Hartmann microlens 120 and sensor 124 is a spectral filter array 118. The microlens array 120 is made up of an array of individual lenses 122 or in another embodiment, the microlens array 120 may be a single pane of material, such as glass, with the individual lenses cut into one face. The spectral filter 118, the sensor 124 and the microlens array 120 are each discussed in more detail below with respect to FIG. 4. In general, however, the spectral filter array 118 is made up of an array of individual spectral filters that each pass one wavelength of laser energy. Similar to the microlens array 120, the spectral filter array 118 may be a single sheet of material with individual filters disposed on the sheet. In a common configuration, there is one spectral filter for each wavelength present in the SBC laser 100. A more general diagnostic unit 116 may have additional spectral filters so that other SBC lasers with a different spectral makeup may be tested.

Figure 4:
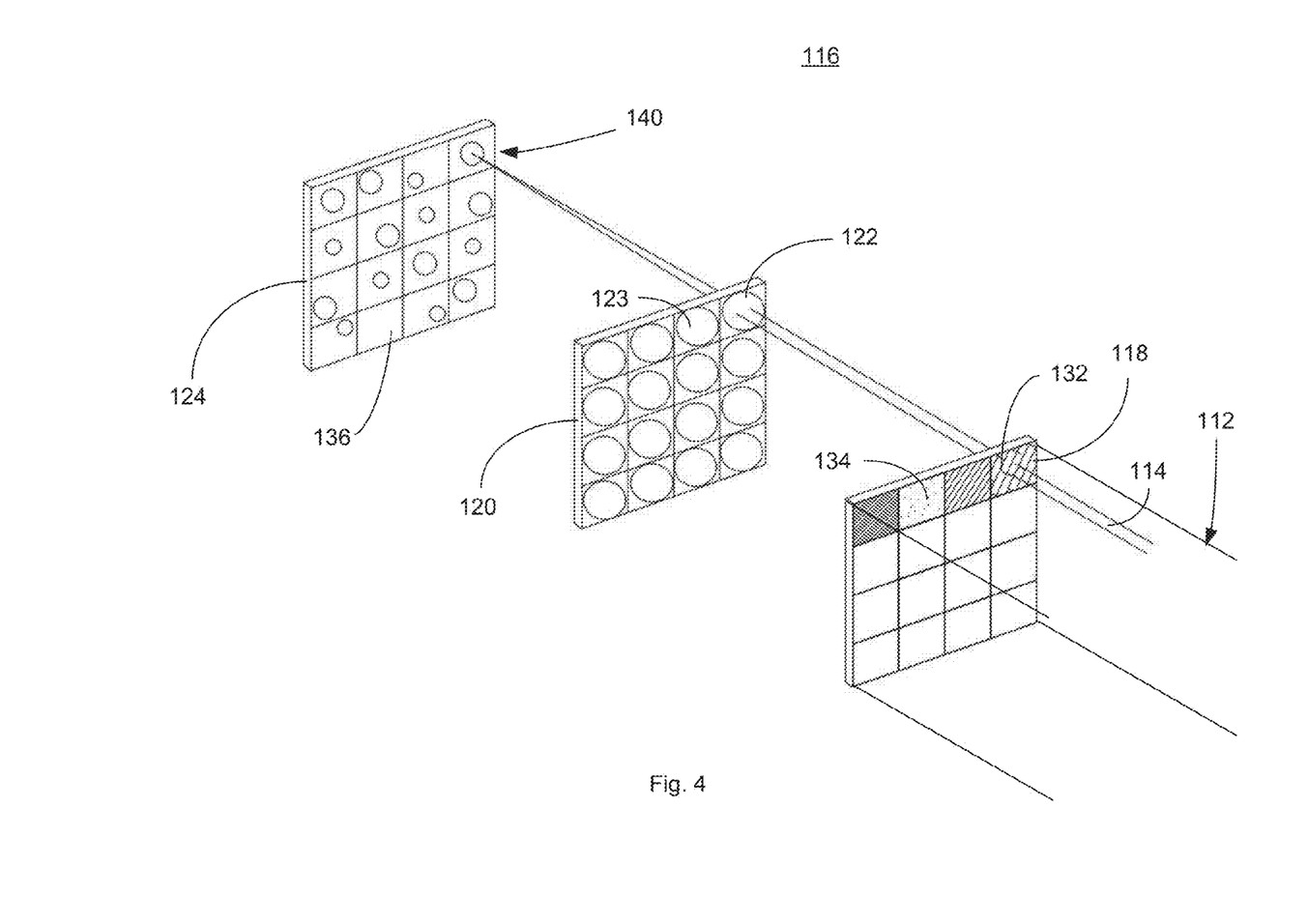
FIG. 4 is a perspective view of a diagnostic unit for use in evaluating spectrally combined lasers.

Turning briefly to FIG. 4, a simplified perspective view of a relevant portion of a diagnostic unit 116 is shown. Incident SBC laser energy in the form of beam 112 is received at an array of spectral filters 118. Individual spectral filters, e.g., filters 132 and 134, each pass separate wavelengths of laser energy, with at least one spectral filter for each wavelength present in the SBC laser. That is, a spectral filter is selected so that the filter passes only one wavelength of laser energy, and particularly, a wavelength that is present in the SBC laser beam. Spectral filters are known and generally available, for example, from Optigrate Corporation of Oviedo, Fla. Laser sources 102, 104, etc., in the SBC laser 100 may be selected to have enough separation between wavelengths so that a wavelength of each laser is outside the cutoff range of a spectral filter for an adjacent (i.e, next closest) wavelength.

As laser energy from the beam 112 reaches the spectral filter array 118, individual wavelengths of laser energy are transmitted separately through each of the individual filters, e.g., filters, 132, 134. An array of microlenses 120 having individual microlenses 122, 123, etc., is oriented so that each individual wavelength of laser energy passing through an individual filter, e.g., filter 132, falls on one microlens 122. The microlens 122 focuses the individual wavelength onto a designated area 140 of a sensor 124 having an array of pixels 138. In other embodiments, an individual wavelength may be directed through multiple microlenses, that is, the spectral filter 132 may be bigger than a single microlens 122. This arrangement allows for multiple calculations for each beam and enables avoiding processing of areas at edges of a beam where multiple filters may overlap a single microlens 122. The microlens array 120 may be in front of or behind the spectral filter 132.

As discussed more below, when the focused beam falls in the center of the designated area 140, the alignment is correct. When the focused beam forms a spot off-center, the alignment needs adjustment. When an individual microlens 122 is not perfectly aligned, a calibration may be applied so that any offset in location of the focused beam from the ideal is accounted for.

When the size of the spot formed and/or the intensity of the beam falling on the designated portion are correct, the focus and power output of the source for that wavelength of laser energy are also correct. If the spot for a particular wavelength is missing, its corresponding source is either not operating or so far off alignment that its spot does not appear on its respective designated area 140. Because each wavelength that makes up the SBC laser beam 112 has its own spectral filter, e.g., 134, its own corresponding microlens and designated area 140 of the sensor 124, all the component beams of the SBC laser beam 112 can be diagnosed, measured, and controlled at the same time and the results can be displayed with an easily recognizable visual (or electronically interpreted) display.

When the sensor 124 is a charge-coupled device (CCD), the electrical output of the sensor 124 may be shown on a graphics display screen such as a video monitor as would any other camera output that uses a CCD sensor. Further, the output of the CCD may directly drive a controller 126 to allow automated diagnosis and corrections to the laser sources 102, 104.

In other embodiments, the spectral filter array 118 may be between the microlens array 120 and the sensor 124. That is, there is no appreciable difference between first focusing the SBC laser energy with a microlens 123 and then filtering to remove all but one wavelength. In yet other embodiments, a spectral filter film, deposition, or grating, may be directly applied or manufactured into each microlens 123 so that a separate filter array 118 is not required.

Figure 5:
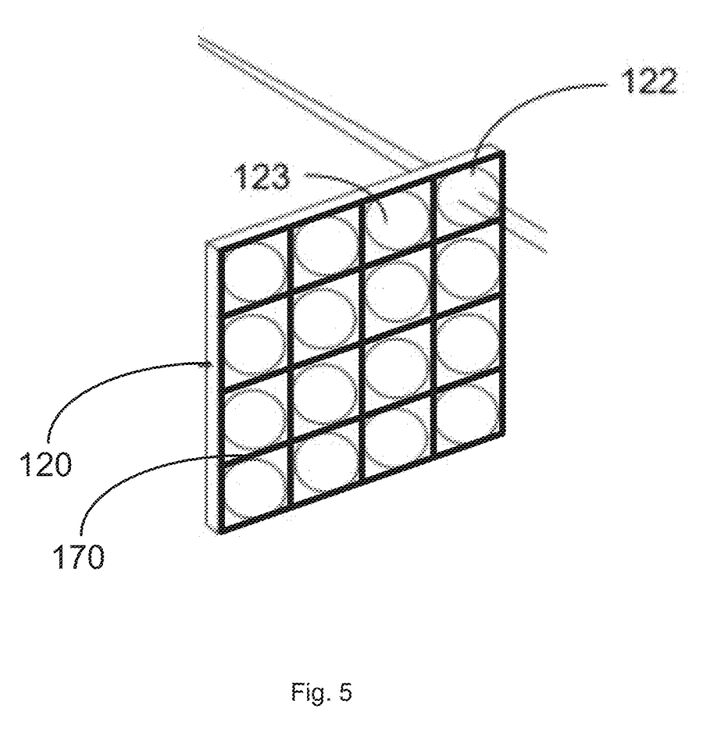
FIG. 5 is a perspective view of a mask used in the diagnostic unit.

FIG. 5 illustrates the microlens array 120 with a mask 170 that is placed or formed over the seams between the individual microlenses 122, 123. The mask 170 helps prevent laser energy from leaking through any of the seams that may cause erroneous data at the sensor 124.

Returning to FIG. 1A, the diagnostic unit 116 may be configured to span the entire SBC laser beam 112, as shown. In another embodiment, the beam may have an additional lens (not depicted) between the grating 110 and the diagnostic unit 116 that focuses the beam onto the diagnostic unit 116 when the beam 112 is wider than the diagnostic unit 116.

The output of the sensor 124, such as an electronic image, may be directed to a display (not depicted) or a controller 126, that may include a display, in order to identify the correctly aligned and focused laser sources 102, 104 as well as to either allow manual or automatic correction of those sources 102, 104 that need a change in alignment or focus. When a beam is missing, the controller 126 may run a diagnostic on its corresponding laser source 102, 104 to attempt to identify and/or correct the laser source. Whether or not the controller 126 can diagnose or adjust laser sources 102, 104, the controller 126 may be send an alert or post an error message related to the status of the individual laser sources 102, 104. The controller 126 is only shown in FIGS. 1A and 1B to improve clarity of concepts, but may be present in any of the embodiments illustrated.

Figure 1B:
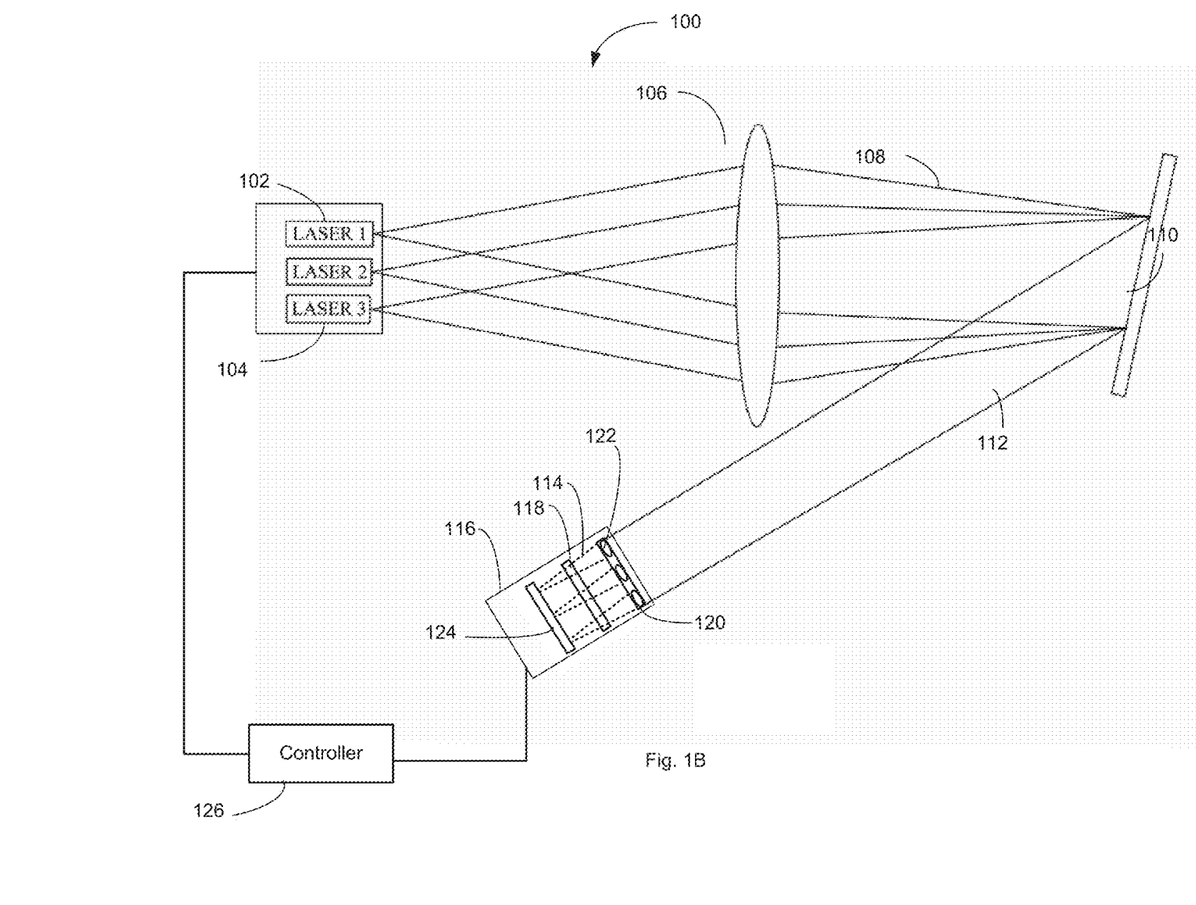
FIG. 1B is a top view of another configuration of the spectrally combined laser incorporating a diagnostic unit.

FIG. 1B illustrates a diagnostic unit 116 with the microlens array 120 in front of the spectral filter 118.

Figure 2:
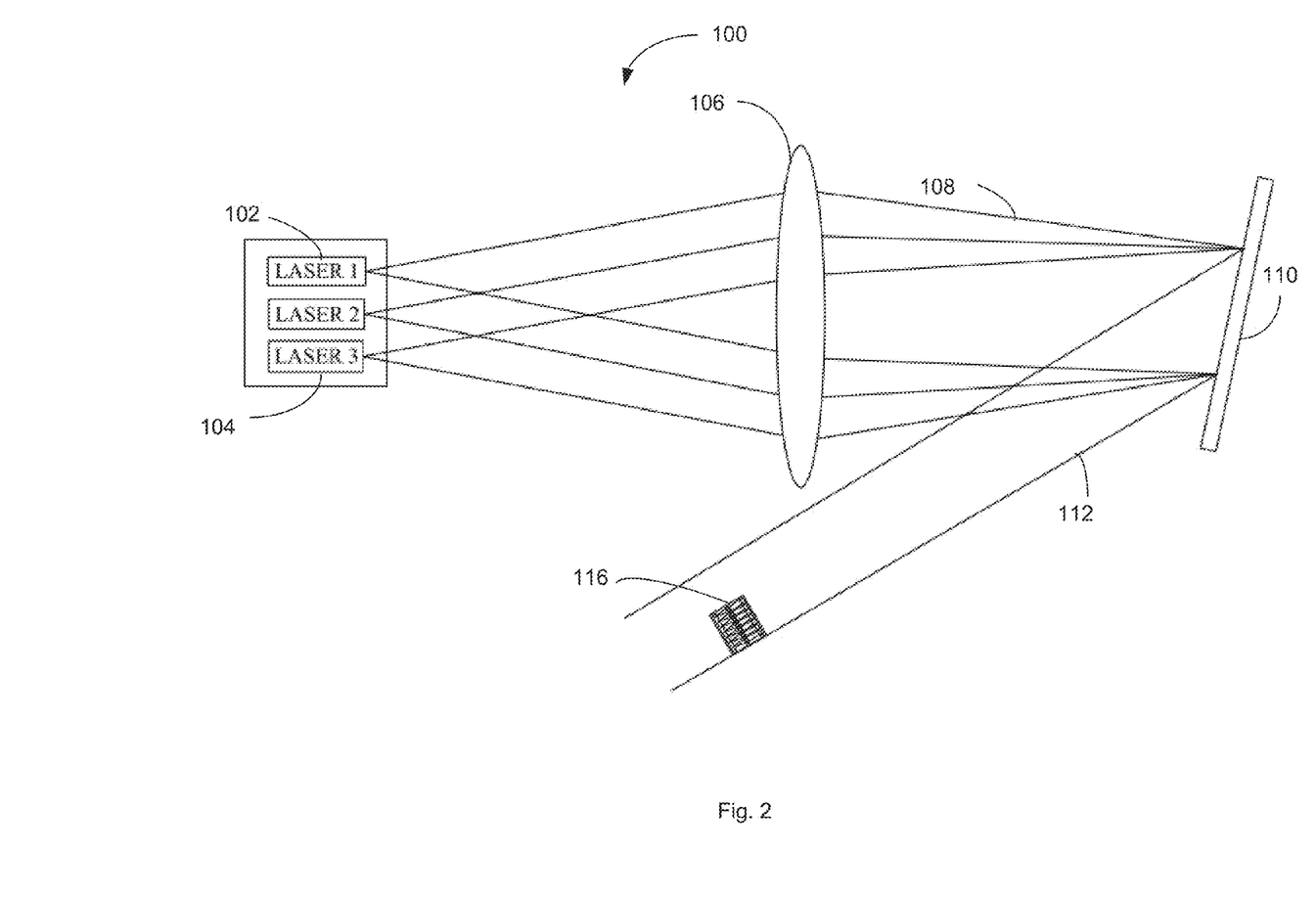
FIG. 2 is a top view of a spectrally combined laser incorporating a diagnostic unit in different configuration.

FIG. 2 illustrates another embodiment for using the diagnostic unit 116. In this embodiment, the beam 112 is wider than the diagnostic unit 116. However, since each wavelength in the SBC laser beam 112 is represented spatially across the full width and height of the beam 112, the diagnostic unit 116 can be deployed in only a portion of the beam 112 and achieve the desired diagnostic function.

Figure 3:
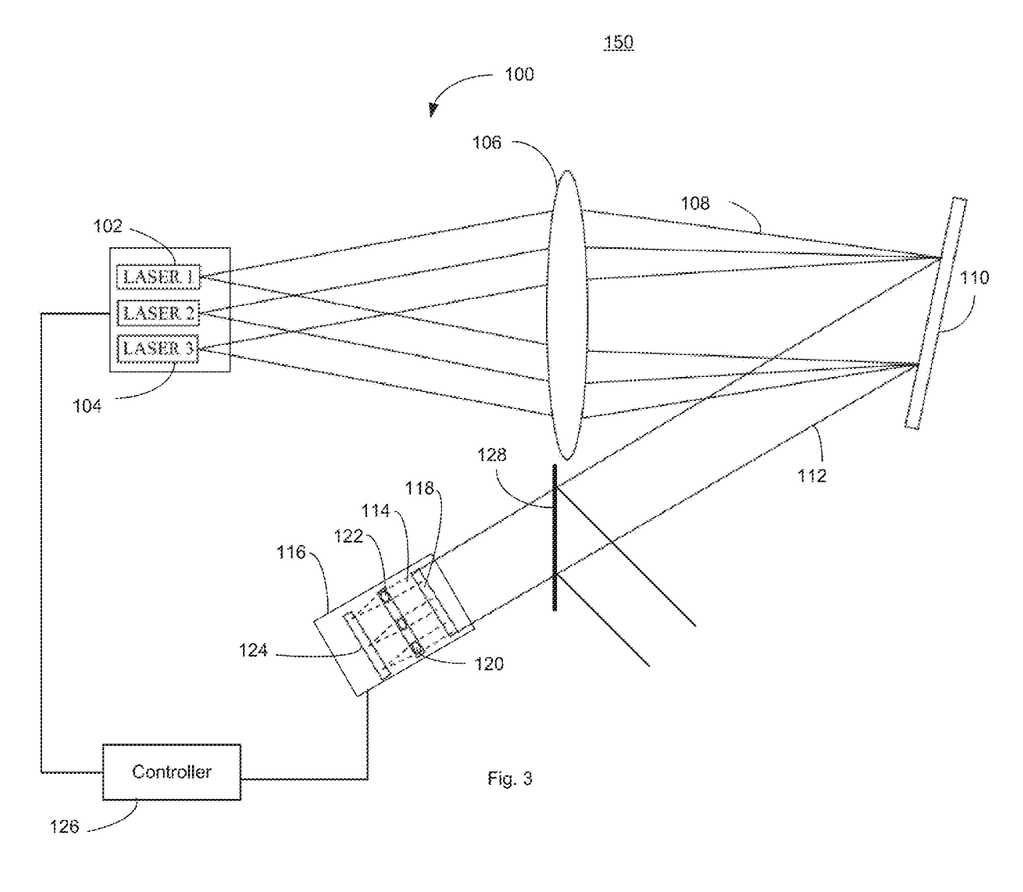
FIG. 3 is a top view of a spectrally combined laser incorporating a diagnostic unit in yet another configuration.

FIG. 3 illustrates an embodiment where a portion of the beam 112 may be redirected by a partial mirror 128 so that the full intensity of the beam 112 does not fall on the diagnostic unit 116. For example, a small amount of laser energy may pass through the partial mirror 128 and one or more optical lenses (not depicted) may focus or recollimate the remaining energy on the diagnostic unit 116. This may allow for the use of lower cost sensors or a reduction in heat dissipation requirements in the spectral filter array 118 and microlens array 120. Other variations of the placement of the diagnostic unit 116 may be accommodated using lenses or other optics. This embodiment using the partial mirror 128 where measurements are made using a portion of the full power beam allows real time measurements and corrections to be made while the SBC laser 100 is in operation so that dynamic environment conditions, such as vibration, may be monitored and corrections applied as needed.

Figure 6:
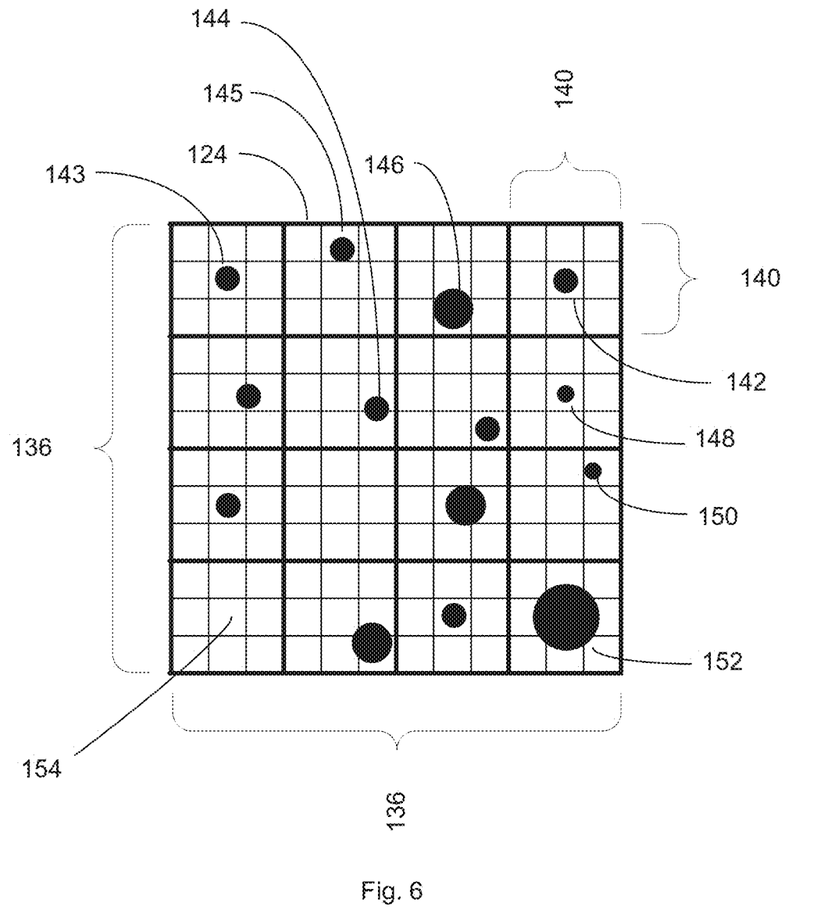
FIG. 6 is a face of an exemplary sensor.

FIG. 6 illustrates a face of an exemplary sensor 124. In the illustration shown, a designated area 140 for an individual wavelength of laser energy 114 is formed by a 3×3 sub-array of pixels. In other embodiments, fewer pixels or more pixels may be used for a designated area 140. The size of the designated area 140 may be a function of the size of the pixels of the sensor 124, the size and focal length of the microlens associated with each spectral filter, the size of each spectral filter, and/or any intervening optics. Additionally, the size and/or density of the designated area 140 may be a function of the level of resolution desired and whether an additional goal is to use the sensor 124 for power output monitoring.

For example, other array configurations may be used. Sub-arrays with an odd number of pixels will allow easy identification of a 'center' location. However, an even number of pixels, such as a 2×2 array can be used. In a 2×2 array, the goal of a perfectly aligned beam would be to impart equal energy onto each of the pixels in the 2×2 array. For larger sub-array sizes, a controller 126 can perform centroid tracking and evaluate arbitrarily large spots corresponding to an individual wavelength of laser energy 114.

Various dots, each having a respective spot size, or more specifically areas illuminated by a laser beam of a single wavelength, illustrate information that allows characterization of the laser sources 102, 104 associated with each designated area 140. The dots 142 and 143 illustrate correctly focused and aligned laser sources, because they each have, for the exemplary embodiment illustrated, the desired diameter and are in the center of their respective dedicated regions. This indicates that the laser beams, e.g. laser energy 114, associated with their respective laser sources are contributing in an optimal manner to the overall output of the SBC laser 100.

Dots 144 and 145 are the desired size but are off center, indicating correct focus but poor alignment. Dot 146 is larger than the desired size and off center, indicating both poor focus and poor alignment. Dot 148 is smaller than the desired size, indicating poor focus, but correctly centered showing correct alignment. Dot 150 is both smaller than desired and off-center indicating poor focus and poor alignment. Dot 152 is larger than desired but centered, indicating good alignment and poor focus. The missing dot at location 154 indicates that its associated laser is either not functioning at all, or is so far out of alignment or focus, or both, that no laser energy of that wavelength is detected at the sensor 124.

Careful selection of individual spectral filters to match the location of the laser sources 102, 104 allows a one-to-one correspondence between the location of a laser source and the position of its designated area. This makes location of the laser source needing adjustment as simple as matching its physical grid location to that of its designated area.

The sensor 124 may also be used for power monitoring after a calibration process. To calibrate the sensor 124, each wavelength may have its laser beam intensity measured and then have the output of the designed area 140 measured so that a correlation between laser beam intensity and output signal level can be created. Once the calibration process is complete, the output signal levels of the sensor 124 in each designated area, assuming proper focus and alignment, can be measured and used to monitor for laser source 102, 104 changes in power output, for example, due to degradation of components over time.

Figure 7:
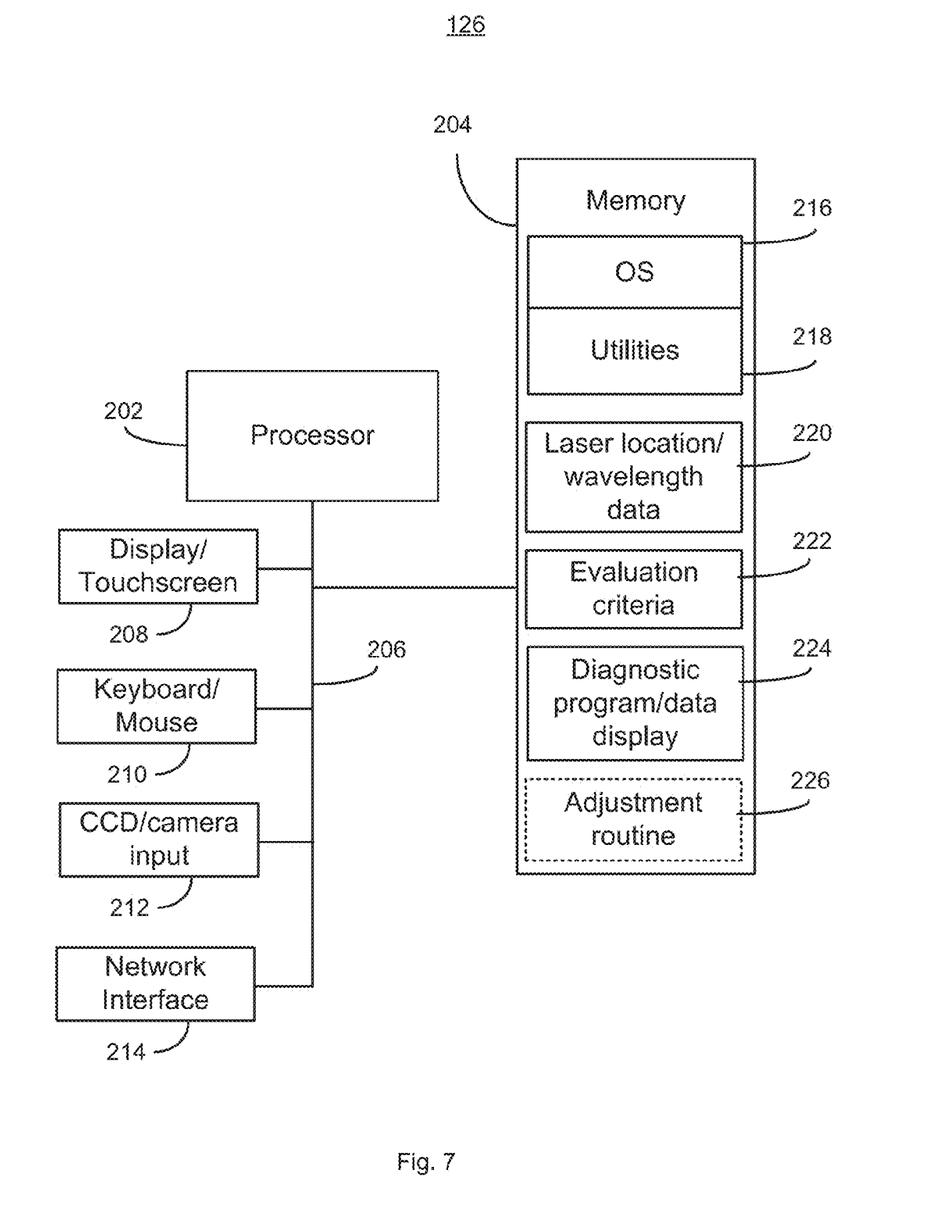
FIG. 7 is a block diagram of a controller.

FIG. 7 illustrates an exemplary controller 126 that may include a processor 202 and a memory 204 coupled by a data bus 206. The controller 126 may include a variety of user interface elements including, but not limited to, a display or touch screen 208, a keyboard and/or mouse 210, and a CCD or camera interface 212. The controller 126 may also include a network interface 214 used to communicate via a local or wide area network with the SBC laser 100 and/or another computer or server (not depicted). The memory 204 may be any of a number of physical hardware memories including separately or in combination, a hard disk drive, a solid-state memory, flash memory, or removable storage media, but does not include propagated media such as carrier waves.

The memory 204 may include an operating system 216 and utilities 218 that provide basic services as well as support or maintenance functions. The memory 204 may also include laser source location and wavelength data 220 that may be used to identify a particular designated area 140 with a particular laser source 102, 104. Evaluation data 222 may be used in analyzing the information received from the sensor 124, such as criteria for evaluating dot size and location and/or power.

A diagnostic program 224 may support receiving data from the sensor 124 and providing an output to the display 208 that may reflect the physical state of the sensor 124 as discussed above with respect to FIG. 6. The diagnostic program 224 may also provide data to an optional adjustment routine 226 that can drive controls at the laser sources 102, 104 to align and focus beams as needed, run diagnostics for missing or low power beams, or both. The diagnostic program 224 may also perform calibration functions to determine the center of the laser spots and edges of filters. For example, the edges of adjacent filters may overlap due to alignment or other manufacturing errors. The calibration function allows suspect or erroneous data generated at the edges of filters to be ignored.

A power diagnostic can be used to identify power fluctuations or power spikes at an individual laser source 102, 104. In this case, the laser source 102 may be shut off to allow a graceful degradation of performance.

Figure 8:
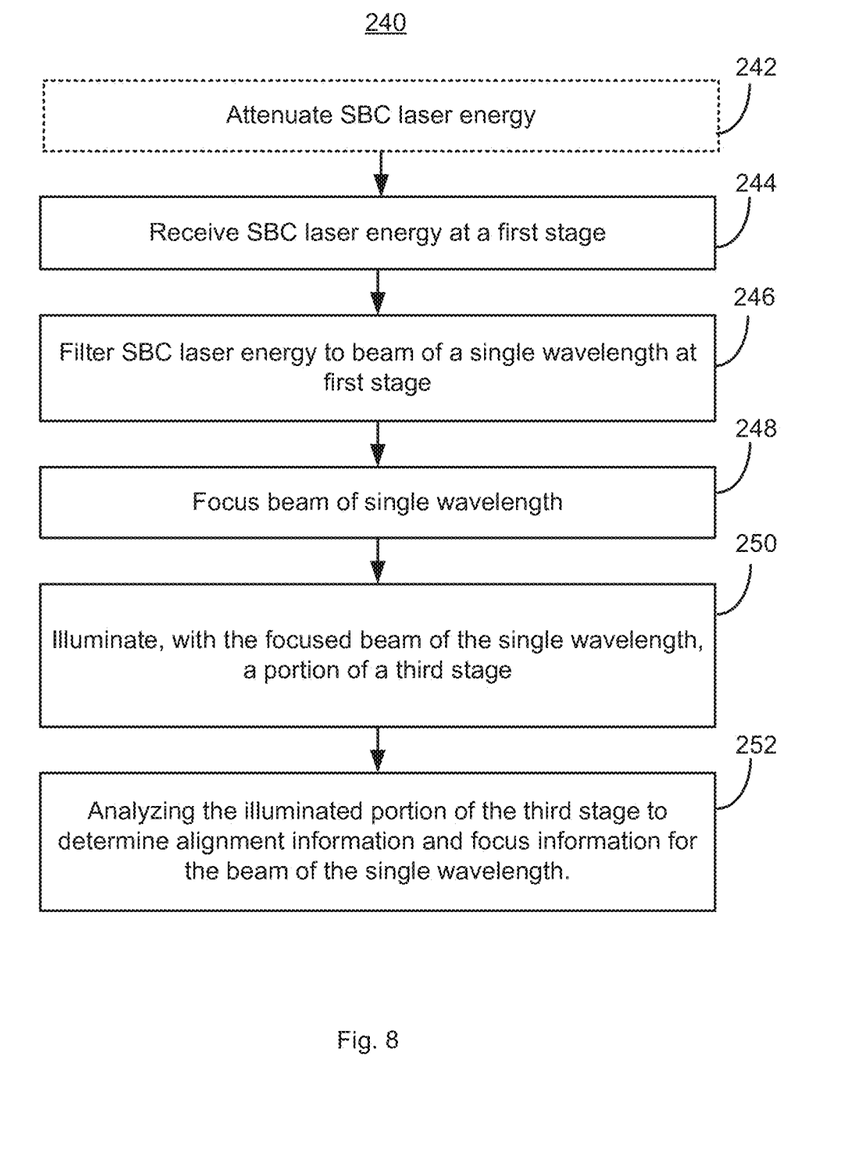
FIG. 8 is method of performing a diagnostic on a spectrally combined laser.

FIG. 8 illustrates an exemplary method 240 of diagnosing a spectral beam combining laser 100. At an optional block 242, the SBC laser beam 112 may be attenuated so that the full power of the beam 112 does not fall on a diagnostic unit 116. As shown in the exemplary embodiments of FIG. 2 and FIG. 3, two techniques for attenuating the SBC laser beam 112 may be to place the diagnostic unit 116 so that only a portion of the beam 112 falls on the diagnostic unit 116 or to pass the beam 112 through a partial mirror so that only a portion of the beam 112 falls on the diagnostic unit 116. Other techniques for power limiting input at the diagnostic unit 116 may also be used.

At block 244, energy from the SBC laser 100 in the form of the SBC laser beam 112 may be received at a first stage of the diagnostic unit 116, the first stage being one spectral filter 132 of an spectral filter array 118. At block 246, the spectral filter array 118 may filter the SBC laser beam 112 to selectively pass a single wavelength of light through each spectral filter 132, 134 of the spectral filter array 118 through to a second stage having a microlens array 120. In other embodiments, the microlens array 120 may be physically in front of the spectral filter array 118, so that the SBC laser beam 112 is focused first and then filtered to a number of single wavelengths.

In yet another embodiment, a single microlens 123 and smaller sensor having only the area of the designated area 140 could be adapted for a evaluating a single beam. In this arrangement, an array of spectral filters 118 could be moved in front of the single microlens 123 and so that each wavelength is separately evaluated. Such a design may allow for a more compact and/or more rugged tool, for example, for use in a field setting.

At block 248, laser energy at a single wavelength that has passed through one element of the spectral filter array 118 may be focused at a second stage such as an array of microlenses 120. At block 250, the focused beam may illuminate a designated area 140 of a third stage of the diagnostic unit 116, such as, a sensor 124. The sensor 124 may convert energy from the focused beam into a signal that is transmitted to a display or the controller 126 so that location, size, and optionally intensity information may be analyzed and used to evaluate alignment, focus, and in some embodiments, power output associated with each laser source 102, 104 present in the SBC laser 100.

The ability to evaluate the results as to which individual laser sources are correctly aligned and focused and those in need of service saves time and the associated cost of former techniques that require each source to be evaluated separately. The use of a CCD for the sensor 124 allows a computer to directly interpret performance of the SBC laser 100 and make appropriate adjustments to individual laser sources 102, 104 while also allowing a visual display so that human operators can oversee the process. Proper placement of wavelength filters in the spectral filter array 118 allows easy identification of the location of a laser source in need of adjustment, simplifying set up and maintenance of the SBC laser 100. The use of attenuators or other optics allows the use of low power components in the diagnostic unit 116 even when an overall output of the SBC laser 100 may be higher than a rating of those components.

While only certain embodiments have been set forth, alternatives and modifications will be apparent from the above description to those skilled in the art. These and other alternatives are considered equivalents and within the spirit and scope of this disclosure and the appended claims.

What is claimed:

1. A diagnostic unit for use in evaluating an alignment and a focus for a laser source that generates laser energy at a particular wavelength in a spectral beam combining (SBC) laser having a plurality of laser sources at a respective plurality of different wavelengths, the diagnostic unit comprising:
   a spectral filter array arranged to accept laser output of the SBC laser, the spectral filter array including a respective spectral filter for two or more of the plurality of different wavelengths, the spectral filter array being substantially perpendicular to the output of the SBC laser;
   a microlens array including a respective microlens for each of the two or more of the plurality of different wavelengths, the microlens array being substantially parallel to the spectral filter array; and
   a sensor aligned with the microlens array and the spectral filter array, the sensor being substantially parallel to the spectral filter array so that laser energy of the two or more of the plurality of different wavelengths simultaneously impinges on the filters of the spectral filter array and the output of each filter impinges a respective microlens, which activates a respective portion of the sensor, wherein an output associated with each portion of the sensor provides an indication of the alignment and the focus of the corresponding wavelength of the SBC laser.

2. The diagnostic unit of claim 1, wherein the output of the sensor indicates a location and a spot size of energy measured at the portion of the sensor, wherein the location corresponds to the alignment and the spot size corresponds to the focus.

3. The diagnostic unit of claim 1, wherein a brightness output of the sensor corresponding to the activated portion of the sensor indicates a power level of the laser source.

4. The diagnostic unit of claim 1, wherein the sensor is a charge-coupled device (CCD) wherein a designated portion of the CCD is a sub-array of one or more pixels associated with a single wavelength of laser energy.

5. The diagnostic unit of claim 1, further comprising a controller coupled to the sensor, the controller configured to interpret the output of the sensor with respect to the activated portion of the sensor and alter a setup of the laser source with respect to at least one of the alignment, the focus, and a power level of the laser source.

6. The diagnostic unit of claim 1, further comprising an attenuator placed between the sensor and the SBC laser.

7. The diagnostic unit of claim 1, wherein the spectral filter array comprises a single sheet of material with a plurality of individual filters disposed on the single sheet.

8. The diagnostic unit of claim 1, wherein the microlens array comprises a single pane of material with a plurality of individual lenses cut into a face of the single pane of material.

9. A diagnostic unit for use in evaluating a set-up of each of a plurality of laser sources, each of the plurality of laser sources having a separate wavelength operating in a spectral beam combining laser (SBC laser), the diagnostic unit comprising:
   a spectral filter associated with two or more of the laser sources and adapted to pass a wavelength of laser energy from the associated laser source, the outputs of the spectral filters being substantially parallel;

a respective microlens aligned with each spectral filter; and a sensor having multiple sensor portions with two or more sensor portions being aligned with two or more respective microlenses so that laser energy passing through each spectral filter causes activation of a respective portion of the sensor, the activated portion indicating an alignment of the respective laser source.

10. The diagnostic unit of claim 9, wherein a size of each activated portion indicates a focus of the respective laser source.

11. The diagnostic unit of claim 9, wherein a brightness sensed in an activated portion indicates a power level of the respective laser source.

12. The diagnostic unit of claim 9, wherein the sensor is a charge-coupled device.

13. The diagnostic unit of claim 12, wherein an array of pixels of the charge-coupled device is designated for each of two or more wavelengths of the SBC laser, each such array of pixels being oriented to receive the laser energy from one microlens.

14. The diagnostic unit of claim 9, further comprising a controller coupled to the sensor, the controller configured to interpret an output from the activated portion and alter a setup of the respective laser source with respect to the alignment of the respective laser source.

15. The diagnostic unit of claim 9, further comprising an attenuator placed between the sensor and the SBC laser.

16. A method of performing diagnostics on a spectral beam combining (SBC) laser having a plurality of sources of laser energy at a respective plurality of different wavelengths, the method comprising:

receiving SBC laser energy including the plurality of different wavelengths;

filtering the SBC laser energy to spatially separate two or more of the plurality of different wavelengths into separate substantially parallel beams;

focusing each of the filtered beams of the SBC laser energy such that each filtered beam illuminates a portion of a sensor; and analyzing at least one illuminated portion of the sensor to provide alignment information and focus information for the respective source of laser energy.

17. The method of performing diagnostics of claim 16, wherein analyzing at least one illuminated portion of the sensor comprises determining a spot size of the filtered and focused SBC laser energy at the sensor portion, the spot size corresponding to a focus of the respective beam.

18. The method of performing diagnostics of claim 16, wherein analyzing at least one illuminated portion of the sensor comprises determining a location on the sensor portion illuminated by the filtered and focused SBC laser energy, the location corresponding to an alignment of a source of the beam.

19. The method of performing diagnostics of claim 16, further comprising: measuring an intensity of at least one beam to identify a power output of the respective source of laser energy.

20. The method of performing diagnostics of claim 16, further comprising: altering a setup of the laser based on at least one of the alignment information and focus information for the respective source of laser energy.

* * * * *